(No Model.)
C. A. MacDONALD.
VALVE AND VALVE CASE.
No. 301,906. Patented July 15, 1884.
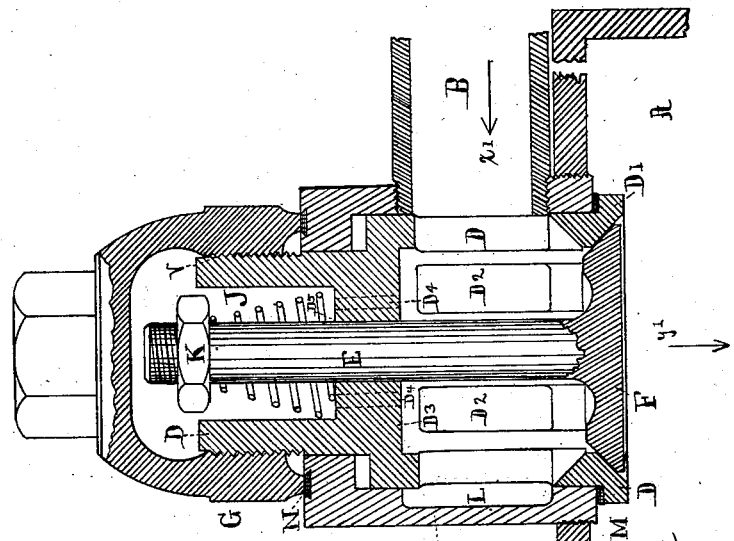
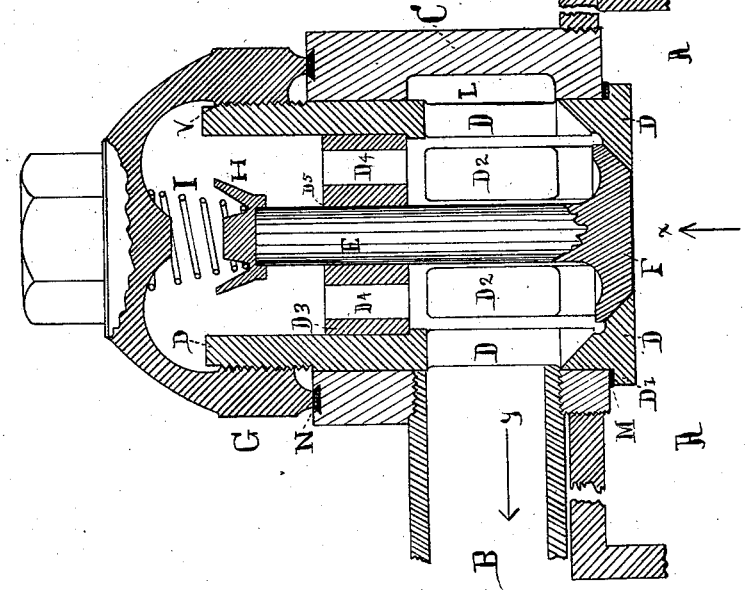
WITNESSES:
H. Kehres,
H. W. Parker
INVENTOR
C. A. MacDonald
BY Burton and Park
ATTORNEYS.
N. PETERS. Photo-Lithographer, Washington, D. C.

UNITED STATES PATENT OFFICE.

CHARLES A. MacDONALD, OF CHICAGO, ILLINOIS.

VALVE AND VALVE-CASE.

SPECIFICATION forming part of Letters Patent No. 301,906, dated July 15, 1884.

Application filed August 13, 1883. (No model.)

*To all whom it may concern:*

Be it known that I, CHARLES A. MACDONALD, a citizen of the United States, and residing at Chicago, in the county of Cook and State of Illinois, have invented certain new and useful Improvements in Valves and Valve-Cases, which are fully set forth in the annexed and following specification and drawings, from which any one familiar with the art to which said invention pertains may understand how to make and use the same.

The object of my invention is to provide a valve-case which can be securely tightened against the outer surface of the lower wall of the valve-chamber at the same time and by the same means by which the screw-cap which tightens it and covers its outer end is tightened against the outer surface of the upper wall of the valve-chamber.

Figure 1 represents a longitudinal section of a valve, valve-case and chamber, and fluid chambers or passages connected therewith, arranged to permit the flow of fluid in the direction of the arrows $x$ and $y$. Fig. 2 represents similar parts arranged to permit the flow of fluid in the direction of the arrows $x'$ and $y'$.

A is a fluid chamber or passage. B is a fluid chamber or passage connected therewith by the valve-chamber C.

D is the valve-case, cylindrical in form, having the flange D' at its inner end, the lateral ports $D^2$, a diaphragm, $D^3$, within it, and a screw-thread, V, at its outer end. The diaphragm $D^3$ has apertures $D^4$ through it, and a central passage, $D^5$, through which the valve-stem E passes.

F is the valve; G, the screw-cap, which engages the thread on the upper end of the valve-case.

H is a cup on the valve-stem, as shown in Fig. 1, to receive the spring I, which bears against the cap G.

J is a spring, as shown in Fig. 2, which bears against the diaphragm $D^3$ and a nut, K, on the end of the valve-stem E. The chambers A B may be of any shape or size desired, or they may be passages to fluid-chambers secured to the valve-chamber in any desired manner. The chamber C has an annular recess about it, L, to give access to the ports $D^2$.

The case is inserted in the chamber C, its flange D' being brought up against the outer surface of the lower wall of the valve-chamber C at M. In this position its screw-threaded end projects so as to be received into and covered by the cap G. The screw-cap is then screwed down against the outer surface of the upper wall of the valve-chamber G at N, and when drawn tightly the flange D' is thereby drawn against the outer surface of the lower wall of the valve-chamber, so as to securely seal the valve-chamber. Such sealing may be made more effectual by putting packing between the flange and cap and the walls of the valve-chamber. The central passage through the diaphragm serves to guide the valve-stem, which reciprocates therethrough, and thus the valve, which is attached to the stem, is directed toward its seat. The springs I and J serve to hold the valves on their respective seats until the pressure is sufficient to force them off. The apertures $D^4$ serve to connect the interior of the valve-case, valve-chamber, and chamber B with the space between the cap and the diaphragm. Thus the fluid-pressure in the said passages or chambers is communicated to the end of the valve-stem, which is in the said space; and the object of this is to equalize the pressure-receiving surfaces on both sides of the valve. If the upper end of the valve-stem were free from pressure, the pressure-receiving surface on the side of the valve toward the chamber B would be less than the fluid pressure-receiving surface on the side of the valve toward the chamber A by a space or area equal to the area of a cross-section of the valve-stem. It is therefore to balance or equalize this pressure that the communication is made between the space inclosing the end of the stem and the fluid-chamber on that side of the valve. For otherwise, if the fluid-pressure on both sides of the valve were the same, and the end of the stem free from pressure, the valve, as shown in Fig. 1, would be forced from its seat, while that shown in Fig. 2 would be held on its seat. These apertures may be dispensed with, as they are not essential, and form no part of this invention, and are not intended to be claimed. Another reason for their use is found in the circumstance that thereby a saving of material in the formation of the diaphragm is effected. This diaphragm may be formed continuous with the case or may be secured thereto in any desired manner.

It will be seen that my invention is applicable to many forms and kinds of valves, although I have shown it as applied only to two forms, such as are frequently used in air-pump connections and in other fluid-pumps.

I do not wish to be understood as claiming any form or kind of valve or chamber; but What I do claim as my invention, and desire to secure by Letters Patent, is relative to the case, and as follows:

1. The combination of a valve-chamber, a valve-case placed therein and having on its lower end a flange which bears against the outer surface of the lower wall of the valve-chamber, and a screw-cap which covers the outer end of the valve-stem, engages the screw-thread thereon, and when screwed down bears against the outer surface of the upper wall of the valve-chamber and tightly draws the case into position.

2. The combination of the valve-chamber B, having the annular recess L, with a cylindrical valve-case, D, having a screw-threaded upper end, V, a flange, D', on its lower end, and the lateral ports D², and the screw-cap G.

And in testimony that I claim the foregoing as my invention I have hereunto set my hand, at Chicago, Illinois, this 9th day of August, 1883, in the presence of two witnesses.

CHARLES A. MacDONALD.

Witnesses:
WM. P. GREENHILL,
CHAS. J. BENTLEY.